June 18, 1940.   W. E. CLARK   2,205,059
CITRUS JUICE EXTRACTOR
Filed Sept. 9, 1937   3 Sheets-Sheet 3

INVENTOR
W. E. CLARK
BY
ATTORNEYS

Patented June 18, 1940

2,205,059

UNITED STATES PATENT OFFICE 2,205,059

CITRUS JUICE EXTRACTOR

William E. Clark, Dundalk, Md.

Application September 9, 1937, Serial No. 163,073

1 Claim. (Cl. 198—26)

This invention appertains to a novel means and method of handling citrus fruits for expeditiously and economically extracting all of the juices therefrom.

In the citrus fruit industry, methods of handling the fruit for juice extraction vary from all manual to all mechanical, with varying degrees of combinations of these. The former requires a large number of employees. The mechanics and operation of the latter are far from perfect and leave much room for improvement.

In all methods, the process begins with cutting the fruit into halves or hemispheres, but no precautions are taken to make these segments equal, which inequalities introduce difficulties in further processing. The halves are variously handled to extract the juice. In some instances, they are held manually over the ends of revolving reamers or burrs. In other instances, they are forced mechanically over metal hemispheres and the juice extracted. In still further instances, they are cut in quarters and mechanically held against a revolving ovoid-shaped extractor made of rods secured to end hubs.

In all cases, the juice, pulp, seeds and part of the rag flow into a common trough from which the same is carried to a separator.

The shortcomings or difficulties of existing mechanical extractors are, first, they require a partial grading of the fruit for size within limited ranges, whereas the fruit coming to the juice plant consists of a mixture of all sizes. In the case of grapefruit, these sizes may range from three inches in diameter to over six inches in diameter. Second, no feed exists (to my knowledge) which will deliver to a machine one fruit at a time from this mixture of sizes. Two small fruit will frequently occupy a carrier or pocket which is large enough to accommodate the largest fruit. Third, the very unequal halving of the fruit introduces difficulties in the following process. Fourth, the segments of fruit become reversed and present the peel to the extractor, which ruptures the oil pores and thus mixes oil with the juice.

It is, therefore, one of the primary objects of my invention to provide a machine which will remedy the conditions set out above, and which will effectively handle all sizes of citrus fruits, without any preliminary grading thereof.

Another salient object of my invention is to provide novel means for delivering one fruit at a time (irrespective of size) to a bucket wheel, with means cooperating with the wheel to cut the fruit in half, the wheel being of such a character as to centralize the fruit relative to the cutting knife, whereby the fruit will be severed very closely in two equal halves.

A further object of my invention is to provide novel means for actuating the fruit delivery mechanism from the bucket wheel in proper timed relation thereto, whereby the proper position of a bucket for receiving the fruit is insured.

A further important object of my invention is to provide means for receiving the fruit halves and for partially severing the halves into quarters of the whole, whereby the slit or kerfed halves will be in proper form to be handled by the extractor, said fruit-receiving means including pairs of endless belts disposed at an angle to one another for insuring the centering of the fruit relative to the kerfing knife or saw, and for holding the halves flat against the cutting table for engagement by the extractor mechanism.

A still further object of my invention is to provide novel means for receiving the kerfed halves, whereby the kerfed halves will be flattened and the rag and pulp scraped therefrom to insure the extracting of all the juice therefrom.

A still further object of my invention is to provide a juice extractor mechanism embodying a corrugated or grooved juice extractor cylinder or roller, and an inclined endless belt for feeding the kerfed halves to the roller and against the same.

With these and other objects in view, the invention consists in the novel construction, arrangement, and formation of parts, as will be hereinafter more specifically described, claimed, and illustrated in the accompanying drawings, in which drawings:

Figure 1:
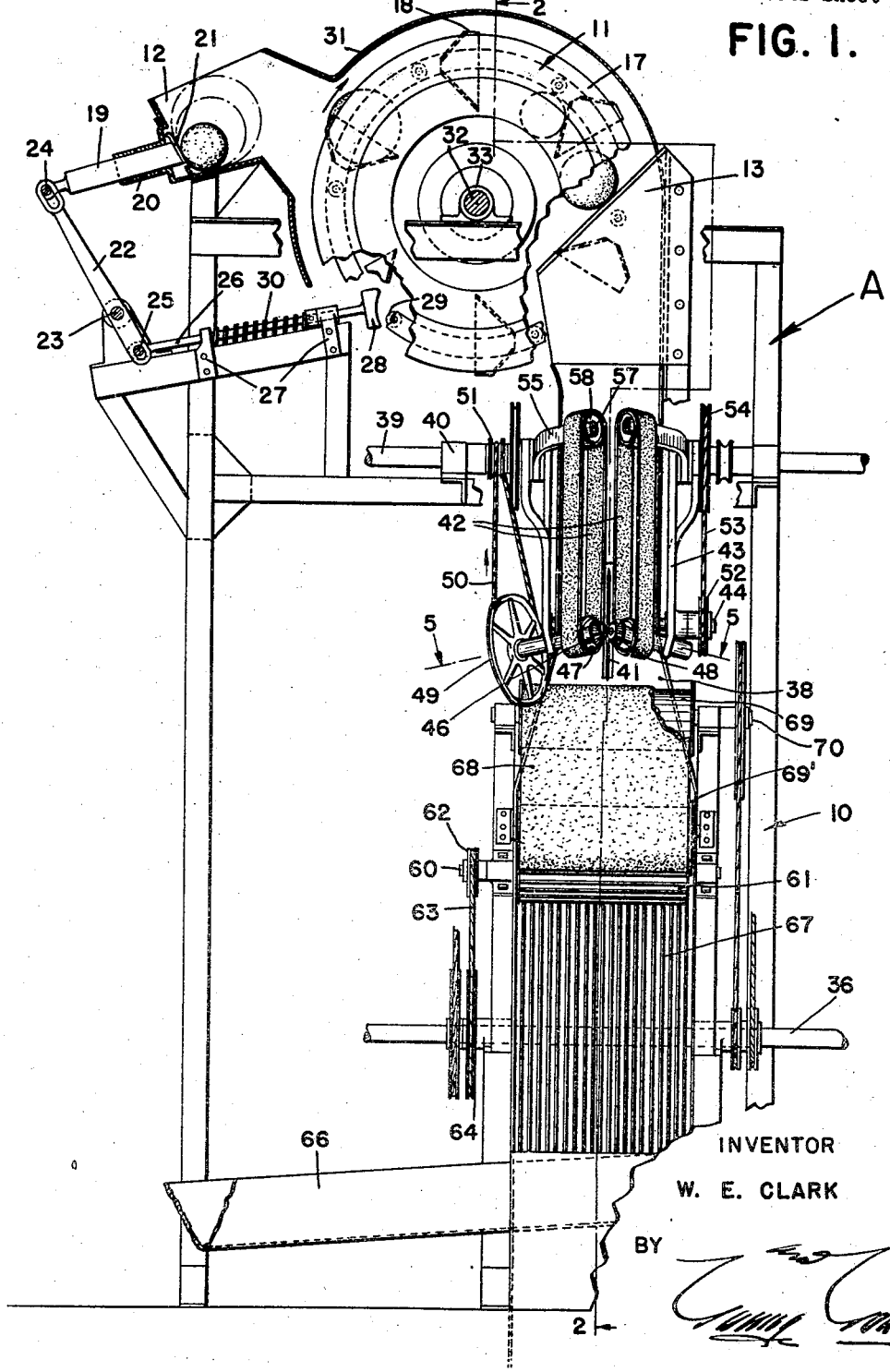
Figure 1 is a front elevation of my improved machine, parts of the machine being shown broken away and in section to illustrate structural details.

Figure 6 discloses a front elevation of an orange or like fruit before being treated by the machine.

Figure 6A is a similar view showing the fruit cut in half by my machine.

Figure 6B is a view similar to Figure 6A, but showing the halves partially cut in two.

Figure 6C is an edge elevational view of the rind of the fruit sections after the fruit sections have been flattened and otherwise operated on by my machine.

Referring to the drawings in detail, wherein similar reference characters designate corresponding parts throughout the several views, the letter A generally indicates the novel fruit extractor machine, and the same comprises a built-up supporting frame 10 on which the various parts of the machine are supported. This frame 10 can be of any suitable design and formed from any desired material.

Mounted on the upper end of the frame is a rotatable bucket wheel 11, and extending toward this wheel is a delivery trough 12. This trough can extend from a hopper in which the fruit is poured as the same is received from the groves.

The bucket wheel 11 is formed in halves so as to permit the passage of the halving knife 13. As illustrated, the bucket wheel includes hub plates 14 securely bolted together, as at 15, and outwardly peripheral inclined flanges 16. These peripheral flanges 16 form, in conjunction with one another, a V-shaped annular way for the fruit to be severed, and the fruit is retained in this way by radially extending guard flanges 17.

At spaced points, the wheel carries the buckets 18 for the fruit, and these buckets are formed in like halves and are rigidly secured to the wheel sections, and the space between the bucket halves is such that the knife 13 can pass freely therethrough. Each bucket is of a cone shape so as to permit the centering of any size fruit within the limits of the machine in the plane of the knife 13. The outer edge of the large diameter of the cones is cut away to facilitate the seating of the fruit when the fruit is ejected from the feed mechanism, which will now be described.

The trough 12 extends in front of the wheel, and the fruit is delivered one at a time by a reciprocating plunger arm 19 from the trough to the bucket wheel. This plunger is mounted within a guideway 20 carried by the trough, and the inner end of the plunger carries a head 21 for engaging the fruit. The plunger 19 is reciprocated back and forth by a lever 22, which is rockably mounted intermediate its ends upon a pivot pin 23 carried by a suitable bearing rigidly mounted on the frame 10 of the machine. A pin-and-slot connection 24 is utilized for connecting the upper end of the lever 22 with the plunger, and a similar connection 25 is utilized for connecting the lower end of the plunger to an actuating slide rod 26. This slide rod 26 is mounted for movement in spaced guides 27 mounted on the frame of the machine. The inner end of the slide rod has formed thereon or secured thereto an actuating or trip foot 28, which is disposed in the path of a plurality of laterally extending operating pins 29 secured at spaced points on one side of the bucket wheel.

Thus, as a pin 29 strikes the slide rod 26, the slide rod will be forced outwardly, and the plunger 19 inwardly for ejecting a fruit from the trough and for delivering the same to the wheel. The position of the pins 29 relative to the foot 28 is such that a fruit will be delivered to the wheel at the moment a bucket passes the trough.

Normally, the slide rod 26 is urged toward the pins by a spring 30, which is coiled about the slide rod. One end of the spring rests against a collar pinned to the slide rod, and the other end of the spring rests against one of the guides 27. As the fruit is carried past the knife 13, the same is cut into approximately equal halves, and while I have shown the knife 13 of the stationary type, it is to be understood that the same can be a revolving knife or saw.

As illustrated, the knife edge is inclined so that a shear cut will be given to the fruit. A suitable guard 31 can be employed for partially housing the bucket wheel so as to hold the fruit in place. When a bucket reaches the top limit of a circular path, the fruit may roll out of its seat. In this event, it will be retained in its respective wheel compartment by the guard 31 and the inclined wheel flanges 16 and the preceding bucket until the wheel is sufficiently advanced to permit the fruit to rest against the cutting edge of the knife 13. The V cross-section of the wheel will keep the fruit centered, and the following bucket will aid this centering and force the fruit over the knife. It may prove practical to accelerate the speed of the bucket wheel until its peripheral speed is equal to the acceleration of gravity, in which case the fruit would remain in the bucket. The wheel maintains the fruit center in the plane of the knife, in any event.

The wheel is secured to a rotatable shaft 32 mounted in bearings 33 carried by the frame 10 of the machine, and the shaft can be rotated in any desired manner. As shown, a pulley wheel 34 is secured to the shaft 32, and this pulley wheel has trained thereabout a drive belt 35, which can be driven in any preferred manner from the main line or power shaft 36. This power shaft 36 is rotatably mounted in bearing brackets 37 carried by the lower part of the frame 10 and is disposed substantially at the central part of the machine. This power or line shaft 36 can be driven from any desired prime mover.

The two halves of the fruit fall on each side of the knife 13 and down onto the oppositely inclined symmetrical chutes 38, and during the travel of the halves down the chutes, the same are partially cut or kerfed so as to form substantially quarters of the whole fruit, with the quarters connected.

The object of partial cutting or kerfing of the fruit hemispheres is to facilitate the flattening of the peel for pulp removal by the extractor and to avoid tearing the edge of the peel at perhaps such close intervals that small sections of the peel would be torn off by the extractor and carried away with the juice.

Disposed between the oppositely inclined guide chutes 38 at the upper ends thereof is a drive shaft 39, and this shaft is rotatably mounted in bearings 40 mounted upon the frame of the machine. This shaft is driven in any desired manner from the line shaft 36. The guide chutes 38 intermediate their ends and at their longitudinal centers, are provided with slots through which extend the rotary kerfing knives 41, which cut the halves of the fruit as the same slide down the chutes. The halves of the fruit are held centered in a novel manner relative to the knives 41 and are held flat against the chutes, so that all likelihood of the fruit halves being inverted is eliminated.

Thus, each chute has mounted thereover a pair of endless belts 42, and the belts of each pair are arranged at an angle to one another to form a substantially V-shaped way. These belts extend adjacent to the lower end of the knife 13 and receive the halves as the halves leave the knife 13. It is to be noted that the pairs of belts are not only inclined toward one another, but also gradually extend inwardly toward the chutes, so that the fruit halves will be firmly held against the knife. The lower ends of the belts are free to swing so that the belts will automatically adjust themselves to the size of the fruit halves, and the knives 41 are mounted on the same frame carrying the belts, so that as the belts swing, the knives will be carried therewith.

Figure 4:
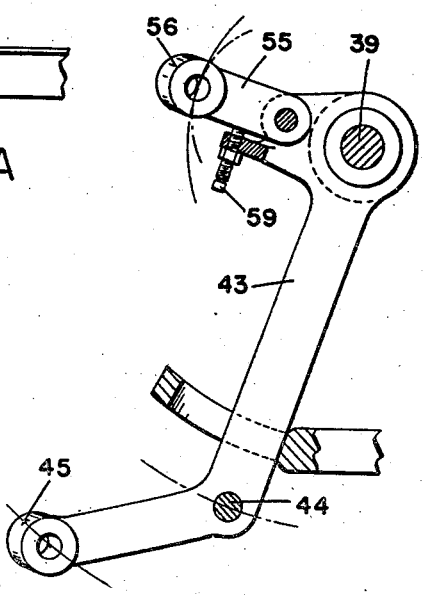
Figure 4 is an enlarged, fragmentary detail view, with parts in section, illustrating the novel means employed for carrying the belts for holding the halved fruits in proper position for further cutting.
Figure 5:
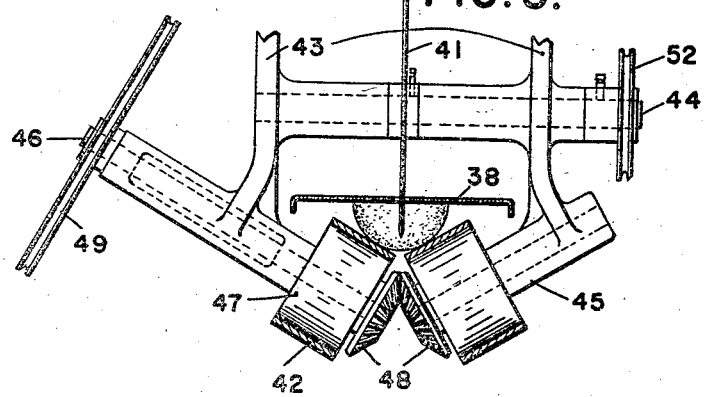
Figure 5 is an enlarged, detail horizontal section taken substantially on the line 5—5 of Figure 2.

The frame for carrying the belts and knives 41 is clearly shown in Figure 4, and each belt frame includes a bell-crank shaped lever 43 rockably mounted upon the drive shaft 39. Each lever at its angle is provided with a bearing for rotatably supporting the knife shaft 44 for the rotatable knives 41, and the lower ends of the arms of the levers are provided with bearings 45 for supporting pulley shafts 46. The pulley shafts 46 carry pulleys 47 for the belts 42, and the inner ends of the shafts are joined by universal joints or beveled gears 48, whereby the same will be rotated in unison. One of the shafts 46 carries a pulley wheel 49, which is operated by a pulley belt 50 from a pulley 51 on the drive shaft 39. The knife shaft 44 has keyed thereto a pulley wheel 52 around which is trained a pulley belt 53 operated from a pulley wheel 54 secured to the line shaft 39.

Rockably mounted upon the upper ends of the frame levers 43 are arms 55 carrying bearings 56 for the upper pulley shafts 57. These pulley shafts carry idler pulley wheels 58 over which are trained the conveyor pulley belts 42, and the lower ends of the conveyor pulley belts 42 are trained over the pulley wheels 48. A set screw 59 is carried by the lever 43 and bears against the swinging arm 55. Hence, by adjusting the set screws 59, the tension of the conveyor pulley belts 42 can be adjusted. As the lower ends of the frame levers 43 are mounted for free swinging movement, the conveyor and holding belts 42 tend to move toward the chutes 38, and to hold the fruit flat against the chutes.

As the kerfed halves of the fruit leave the conveyor belts 42 and the knives 41, the same continue down their respective chutes to the extractor mechanism. The extractor mechanism is duplicated on each side of the machine, and hence only one extractor will be described in detail.

Each extractor includes a corrugated or grooved extractor cylinder or roll 60, and this roll is secured to a shaft 61 rotatably mounted in suitable bearings on the frame of the machine. The shaft 60 has keyed or otherwise secured thereto a pulley wheel 62, which is operatively connected by means of a pulley belt 63 with a pulley wheel 64 on the line shaft 36. Extending under the lower end of each guide chute is a juice-receiving partial housing 65, and this housing opens into a juice trough 66. The trough 66 receives the juice, the pulp, seeds, and rag from the juice extractor, and mounted above the trough and the partial housing 65 is a grate or screen 67 over which the peel travels. As the chute is inclined, the peel drops therefrom into a suitable refuse receptacle or conveyor.

The extractor roller or cylinder 60 is mounted below and inwardly of the lower edge of its chute, with a part of the periphery thereof just extending above the chute, whereby the groove will be enabled to receive the edges of the kerfed halves. Mounted above the extractor roller 60 and over the chutes 38 are inclined feed and holding belts 68 for the kerfed fruit halves.

Figure 2:
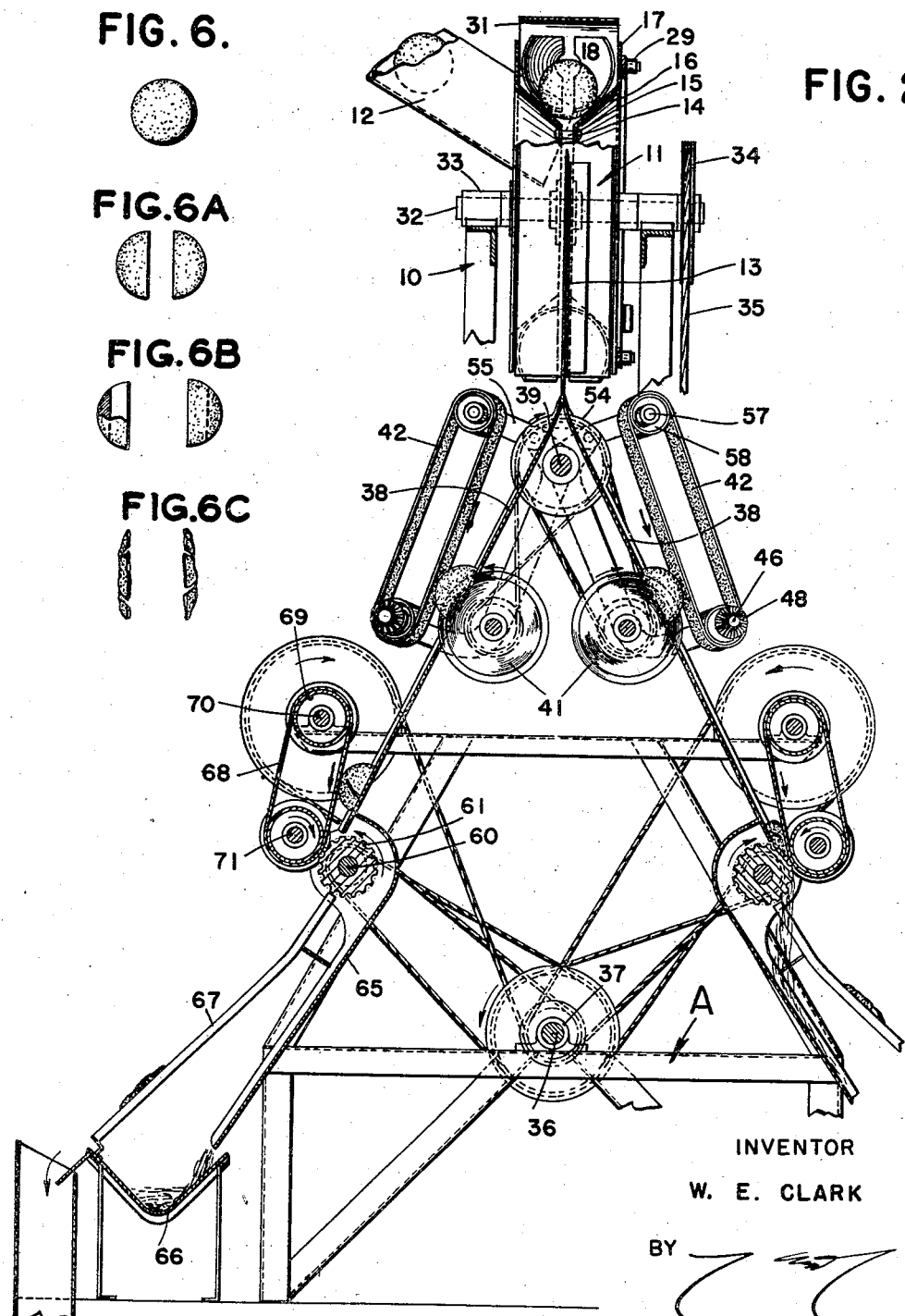
Figure 2 is a vertical section through the machine taken substantially on the line 2—2 of Figure 1, parts of the framework being eliminated to more clearly illustrate operating parts of the machine.
Figure 3:
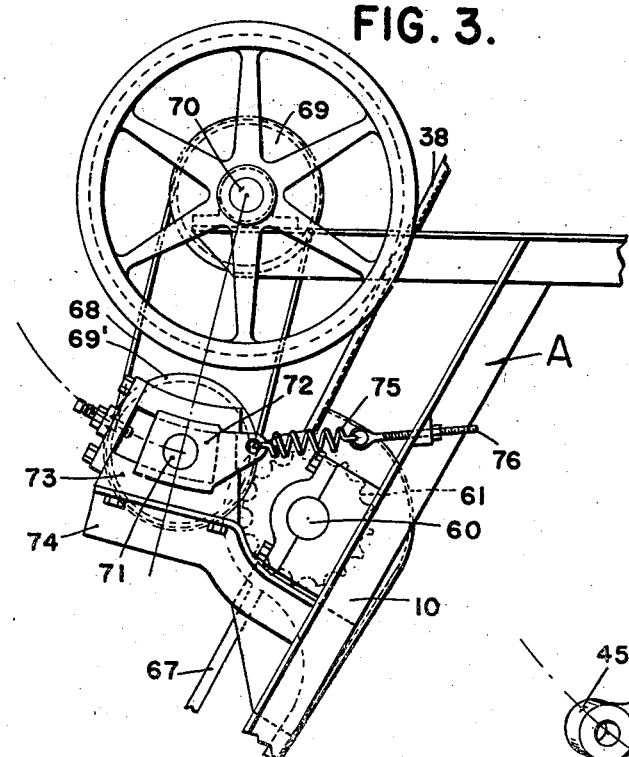
Figure 3 is an enlarged, fragmentary side elevation of the machine, illustrating the novel means employed for holding the delivery belt against the juice extractor roller.

The upper ends of the conveyor and holding belts 68 are trained over a relatively long drive pulley wheel 69, which is keyed to a shaft 70. The shaft 70 is driven from the line shaft 36, and suitable pulley and pulley wheels are utilized for this operation, as is clearly shown in Figures 1 and 2 of the drawings.

The lower ends of the belts 68 are trained over a relatively long pulley wheel 69', and this pulley wheel is carried by a shaft 71, the ends of which are received in bearing blocks 72. The bearing blocks 72 are slidably mounted in guideways or tracks 73 mounted upon bracket arms 74 carried by the frame. These slide bearings 72 are connected by means of springs 75 with adjusting rods 76 carried by the frame 10.

By this arrangement of parts, the pulley wheel 69' and its conveyor belt 68 is normally urged toward the chutes 38 and into engagement with the grooved extractor roller. The tension of the belts on the roller can be varied by adjusting the rods 76.

As the kerfed halves of the fruit ride between the chutes 38 and the conveyor belts 68, the belts gradually flatten the hemispheres sufficiently to permit the edge of the peel to be caught by the revolving extracting cylinder or roll 60. As the fruit hemispheres pass between the conveyor belt and the extractor roll the peel is flattened.

The extractor roll 60 revolves at a higher rate of speed than the belt travel, and thereby pulls or rakes off the pulp, seeds, and most of the tougher rag from the inner surface of the peel. The pulp cells are broken and the juice liberated. The swinging movement of the lower ends of the conveyor belt 68 permits the thorough cleaning of peels of various thicknesses and permits the passage of heavy or thick stem ends of the fruit without undue breaking of the peel.

As explained, the extracted juice, seeds, pulp, and rag of the fruit drop through the grid or screen 67 onto the apron or partial housing 65, and thence down to the juice trough 66, from which it flows to the usual separator (not shown).

Referring back to the kerfing mechanism, it is also to be noted that I propose to have the speed of the conveyor and holding belts 42 faster than the speed of the bucket wheel 11, so that only one half of fruit is under the belts at a time. Should the weight of the kerfing assembly be such as to tend to flatten the fruit halves unduly, this weight can be partially counterbalanced by weights or springs.

From the foregoing description it can be seen that I have provided an exceptionally simple and durable mechanism for handling citrus fruits of various sizes, which is so constructed and arranged as to economically and efficiently extract all of the juice from the fruit without waste.

Changes in details may be made without departing from the spirit or the scope of the invention, but what I claim as new is:

In a citrus juice extractor, a bucket wheel having a plurality of equidistantly spaced centering buckets for the fruit, equidistantly spaced laterally extending trip pins carried by the wheel disposed at predetermined positions relative to the buckets on the wheel, a trough leading to said wheel, a reciprocating plunger mounted in the trough for delivering one fruit at a time, irrespective of size, to the bucket wheel, an operating rod, means operatively connecting the rod to the plunger, a cam foot on the rod normally disposed in the path of the pins, whereby to actuate the plunger in proper timed relation relative to the buckets on the wheel.

WILLIAM E. CLARK.